Figure 1:
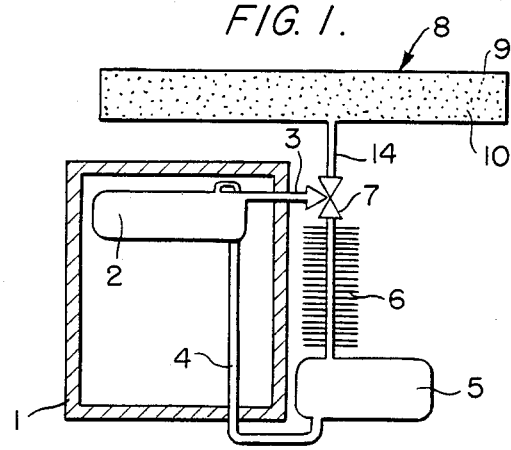

United States Patent [19]

Paeye

[11] Patent Number: 4,531,384
[45] Date of Patent: Jul. 30, 1985

[54] SOLAR-POWERED REFRIGERATION UNIT

[75] Inventor: Gérard F. Paeye, Champagne sur Seine, France

[73] Assignee: Jeumont-Schneider Corporation, Puteaux, France

[21] Appl. No.: 515,761

[22] Filed: Jul. 21, 1983

[30] Foreign Application Priority Data

Jul. 22, 1982 [FR] France .............................. 82 12824

[51] Int. Cl.³ .............................................. F25B 17/00
[52] U.S. Cl. ...................................... 62/477; 62/235.1
[58] Field of Search ...................... 62/476, 477, 238.3, 62/235.1

[56] References Cited

U.S. PATENT DOCUMENTS 2,108,360 2/1938 Allyne et al. .......................... 62/477
2,293,556 8/1942 Newton ..................................... 62/5
4,205,531 6/1980 Brunberg et al. ...................... 62/477

FOREIGN PATENT DOCUMENTS

| 466626 | 10/1928 | Fed. Rep. of Germany . |
| 636013 | 10/1936 | Fed. Rep. of Germany . |
| 575824 | 1/1924 | France . |
| 620769 | 12/1926 | France . |
| 820484 | 4/1937 | France . |
| 920510 | 1/1947 | France . |
| 2441134 | 11/1978 | France . |
| 317340 | 8/1929 | United Kingdom . |
| 436402 | 10/1935 | United Kingdom . |

Primary Examiner—Henry Bennett
Attorney, Agent, or Firm—Rines and Rines Shapiro and Shapiro

[57] ABSTRACT

The invention pertains to refrigeration units which operate by means of heat energy, and especially solar energy, wherein the mode of operation consists of a desorption phase and an adsorption phase. The energy collector (8) contains a material (10) with high adsorption and desorption capacity, such as zeolite, and it is connected to an evaporator (2) situated within an insulation chamber.

4 Claims, 3 Drawing Figures

SOLAR-POWERED REFRIGERATION UNIT

The present invention pertains to refrigeration units which function as a result of intermittent supplying of heat energy, and, more specifically, as a result of the connection which is provided between a solar energy collector and a freezer.

Many types of refrigeration units where freezing takes place or is maintained at night by means of heat collected during the day by a solar energy collector have been developed heretofore. For example, U.S. Pat. No. 2,391,434 describes a unit of this type. The operating cycle for these units consists of two phases:

a day phase during which fluid flows through a specific line, from the solar energy collector to the freezer;

a night phase during which fluid flows through another line, from the freezer to the solar energy collector.

When the two lines intersect at the outlet for the solar energy collector, a three-way valve which must be operated at the start of each phase is usually employed to change the direction in which the fluid travels.

For this type of refrigeration unit, it is therefore necessary for procedures to be performed twice during each cycle.

The purpose of the present invention is to provide a completely independent system and to eliminate these procedures without relying upon an auxiliary source of power.

Accordingly, the present invention pertains to a refrigeration unit which operates by means of heat energy, wherein the operating cycle includes an adsorption phase, containing an energy collector outfitted with a material possessing a high adsorption and desorption capacity, which is connected to an evaporator installed within an insulation chamber. The connection is provided by a conduit which, on one hand, is connected to the evaporator by one pipe, whereas, another pipe, on the other hand, connects said conduit to a condenser, to a tank, and, lastly, to the evaporator, with the entire circuit containing a fluid. In accordance with the present invention, the first pipe, immediately prior to the junction with the second pipe, contains an elbow constituting a siphon whose width, angle, and bending radius allow accumulated condensation, derived from said fluid, to form at the beginning of the desorption phase, thereby providing complete sealing of the first line. Furthermore, the shape of said siphon is such that, at the beginning of the adsorption phase, the condensate shall be removed by means of evaporation, thereby clearing the first pipe. The present invention, as well as other functions, advantages, and characteristics of said invention, shall be more fully understood in relation to the subsequent description of a version of said invention, as a non-restrictive example, with three sketches having been provided as illustrations.

FIG. 1 represents a conventional refrigeration unit wherein it is possible to install the invention advantageously.

Figure 2:
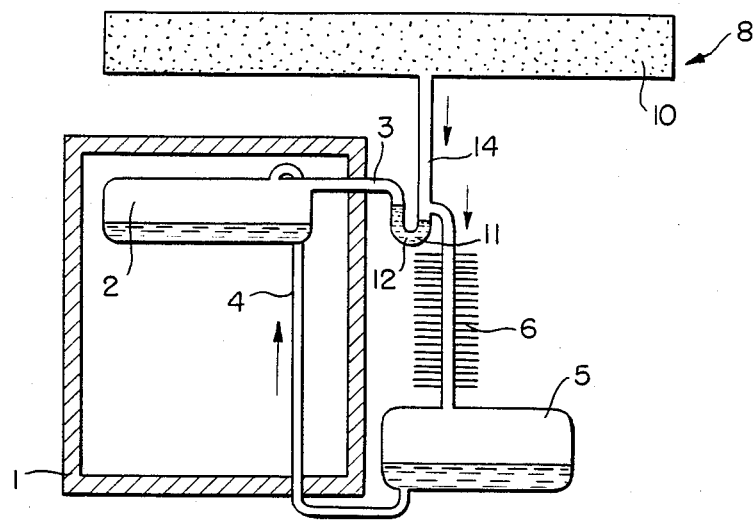

FIG. 2 provides a diagram of a refrigeration unit in accordance with the invention, during the initial phase of the operating cycle.

Figure 3:
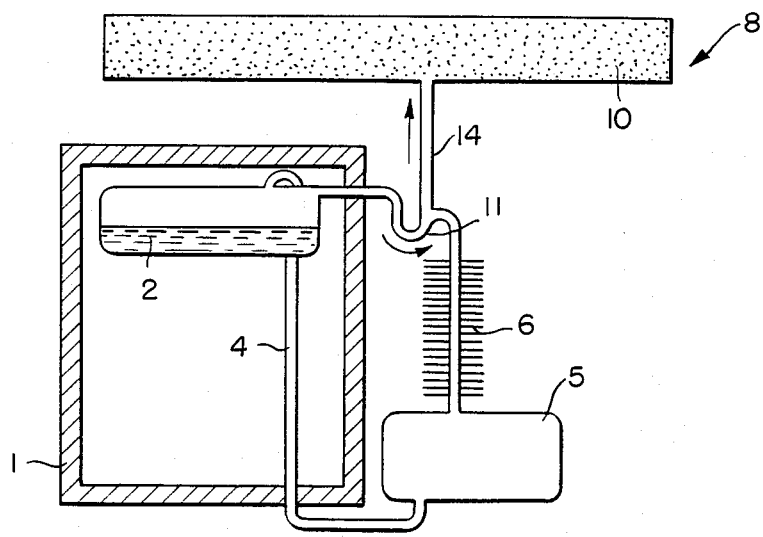

FIG. 3 provides a diagram of a refrigeration unit in accordance with the invention, during the second phase of the operating cycle.

For fuller comprehension and recognition of the role and advantages of the present invention when it is installed within certain types of refrigeration units, an explanation of how one of these units functions is necessary.

Within FIG. 1, the refrigeration unit contains an insulation chamber (1) and a solar energy collector (8) which is connected to said chamber. The insulation chamber (1) constitutes a freezer where it is possible, for example, to store food products which can be kept at a temperature of approximately 0° C., as a result of cooling obtained by means of a solar energy collector (8) which, in conjunction with other components of the unit, causes freezing to occur within the evaporator (2) enclosed within the insulation chamber (1). The solar energy collector (8) consists of a chest (9), preferably made of copper, wherein the inner portion is lined with an adsorbent material (10), such as zeolite, which is a microporous composite aluminum silicate with high adsorption and desorption capacity. The previously cited solar energy collector (8) is connected to a circuit which contains water. This circuit includes an evaporator (2) installed within the insulation chamber (1), a pipe (3) which connects evaporator (2) to a three-way valve (7), another pipe which connects a conduit (14) to the upper portion of a condenser with fins (6), and connects the lower portion of said condenser (6) to an outside tank (5), as well as connecting the lower portion of the condenser to the upper portion of the evaporator (2). Water travels within a hermetically sealed circuit where pressure levels between 10 and 100 millibars are maintained. The operating principle is described hereinafter.

During the day, sunlight heats the solar energy collector (8), as well as the zeolite (10) situated therein; temperature and pressure inside the solar energy collector (8) increase gradually. With the three-way valve (7) blocking the pipe identified as (3), the zeolite releases water by desorption, producing water vapor which travels toward the condenser (6). Condensation is attributable to the fact that a tube (4) of the capillary type, extending between the outside tank (5) and the evaporator (2), causes pressure inside the evaporator (2) to be considerably lower than pressure within the solar collector (8); on account of the difference in pressure, condensed vapor travels toward the evaporator (2) and collects there. At nightfall, temperature and pressure levels inside the solar collector (8) decrease, and the evaporator (2) has become partially filled with water which has undergone condensation during the day. The zeolite (10) now functions as a chemical compressor.

At night, the temperature of the zeolite (10) continues to drop, and pressure within the condenser (6), the tank (5), and the solar collector (8) also decreases. In the conventional refrigeration unit of FIG. 1 the three-way valve (7) is reset in order to open the pipe identified as (3) and in order to block the connection with the condenser (6). At this point, the zeolite functions as a chemical pump, and it adsorbs water evaporating within the evaporator (2), causing pressure inside the evaporator to change. Inasmuch as the circuit is hermetically sealed, the water remaining within the evaporator (2) freezes, and it therefore facilitates maintenance of a temperature of approximately 0° C. within the insulation chamber. This adsorption phase produces refrigeration which continues until the morning.

Within FIG. 2, which shows a refrigeration unit operating in accordace with the invention during the desorption phase, the three-way valve, in accordance with the present invention, has been eliminated, and the pipe identified as (3) is bent so as to constitute a siphon. The width, angle, and bending radius are such that, at the onset of the desorption phase, as the day begins, water condensation which forms beyond the outlet of the solar energy collector (8) accumulates within the elbow (11) of said siphon, forming an obstruction (12) which completely seals the pipe identified as (3). The junction for the condenser (6) and the conduit (14) is situated immediately above this siphon, so that vapor can only travel toward the condenser (6). The weight of the condensate (12) is negligible in relation to the weight of condensed water which accumulates within the evaporator (2) during the desorption phase. The direction in which fluid shall flow is represented by arrows within FIG. 2.

FIG. 3 shows a refrigeration unit operating in accordance with the present invention during the adsorption phase, which takes place at night. Considering the refrigeration unit of the invention, as shown in FIG. 2, inasmuch as the zeolite attracts water, the mass of condensate (12) evaporates, with water vapor being adsorbed by the zeolite (10). The pipe identified as (3) is no longer blocked, and it is therefore possible for vapor originating from the evaporator to be adsorbed. The direction in which fluid shall flow is represented by arrows in FIG. 3.

The shape of the siphon and the position of the conduit (14) which are shown within FIGS. 2 and 3 only represent one example of application of the present invention. It is possible to adapt the invention for other refrigeration units wherein the source of energy may occupy a different position in relation to the insulation chamber (1), with the pipe (3) being adapted in accordance with other possible configurations.

Furthermore, the unit has been described in terms of use of zeolite as an adsorptive material and water as the fluid, with the temperature inside the insulation chamber (1) to be slightly higher than 0° C. It is also possible for such a unit to operate advantageously with activated carbon as an adsorptive material and methanol as a fluid. In such situations, the temperature within the insulation chamber (1) shall be less than 0° C., and it is possible for freezing to occur within the insulation chamber.

Lastly, it should be noted that the presence of a tank within the fluid line is not required for operation of the refrigeration unit.

Although only one version of the present invention has been described, it is obvious that any modifications which may be introduced by technically knowledgeable persons on the basis of the same principles would not represent departures from the context of this particular invention.

I claim:

1. A refrigeration unit which operates by means of heat energy and wherein the mode of operation comprises a desorption phase and an adsorption phase, said refrigeration unit comprising an energy collector containing a material possessing high adsorption and desorption capacity for refrigerant fluid connected in circuit with an evaporator situated within an insulation chamber, said circuit including a conduit extending from said energy collector, a first pipe which connects said conduit to said evaporator, a second pipe which connects said conduit to a condenser, and a third pipe which connects said condenser to said evaporator, said first and second pipes forming a junction with said conduit, said circuit containing a refrigerant fluid, said refrigeration unit being characterized by the fact that the first pipe, immediately before said junction, contains an elbow forming siphon means whose width, angle, and bending radius cause condensation derived from said fluid to accumulate and form an obstruction which, during the desorption phase, blocks the first pipe and which is removed by evaporation during the adsorption phase, leaving the first pipe open.

2. A refrigeration unit in accordance with claim 1, characterized by the fact that the energy collector is a solar energy collector.

3. A refrigeration unit in accordance with claim 1, characterized by the fact that said material is zeolite and that said fluid is water.

4. A refrigeration unit in accordance with claim 1, characterized by the fact that said material is activated charcoal and that said fluid is methanol.

* * * * *